(12) United States Patent
Okada

(10) Patent No.: US 10,882,643 B2
(45) Date of Patent: Jan. 5, 2021

(54) CAPTURING PLATE, ON-ORBIT DEVICE AND METHOD FOR CAPTURING

(71) Applicant: Astroscale Japan Inc., Tokyo (JP)

(72) Inventor: Mitsunobu Okada, Tokyo (JP)

(73) Assignee: Astroscale Japan Inc., Tokyo (JP)

( * ) Notice: Subject to any disclaimer, the term of this patent is extended or adjusted under 35 U.S.C. 154(b) by 252 days.

(21) Appl. No.: 15/607,191

(22) Filed: May 26, 2017

(65) Prior Publication Data

US 2017/0341783 A1 Nov. 30, 2017

(30) Foreign Application Priority Data

May 27, 2016 (JP) .................. 2016-106545

(51) Int. Cl.
*B64G 1/64* (2006.01)
*B64G 1/10* (2006.01)

(52) U.S. Cl.
CPC ............. *B64G 1/646* (2013.01); *B64G 1/10* (2013.01)

(58) Field of Classification Search
CPC .................................... B64G 1/646
See application file for complete search history.

(56) References Cited

U.S. PATENT DOCUMENTS

| 3,794,270 A * | 2/1974 | Wilkens | B64G 1/32 244/172.4 |
| 3,949,463 A * | 4/1976 | Lindmayer | G03F 7/091 438/72 |
| 4,607,815 A * | 8/1986 | Turci | B64G 1/646 244/172.4 |
| 4,815,845 A * | 3/1989 | Colbaugh | B64G 1/646 356/153 |
| H1378 H * | 11/1994 | Crane | 244/172.5 |
| 7,374,134 B2 * | 5/2008 | Collyer | B64G 4/00 219/72 |
| 7,607,616 B2 | 10/2009 | Lundgren | |
| 8,979,034 B2 | 3/2015 | Goff et al. | |
| 2004/0149860 A1 * | 8/2004 | LeCroy, Jr. | B64G 1/646 244/158.1 |
| 2008/0001361 A1 * | 1/2008 | Daniels | B64G 1/646 277/315 |
| 2008/0220262 A1 * | 9/2008 | Plotto | B64G 1/222 428/432 |
| 2011/0192936 A1 | 8/2011 | Knirsch | |
| 2012/0076629 A1 * | 3/2012 | Goff | B25J 9/1612 414/730 |
| 2012/0080563 A1 | 4/2012 | Gryniewski et al. | |

(Continued)

FOREIGN PATENT DOCUMENTS

| JP | 03105602 A * | 5/1991 | ............ B64G 1/646 |
| JP | H06-331380 A | 12/1994 | |

(Continued)

*Primary Examiner* — Magdalena Topolski

(57) ABSTRACT

A capturing plate is attached to an on-orbit device, and the capturing plate is attached to a part of the on-orbit device where a capturing device bonds to the on-orbit device in space with a bonding component, including adhesive, of the capturing device. A method for capturing the on-orbit device includes moving the capturing device including the bonding component to the on-orbit device and letting the bonding component of the capturing device adhere to the on-orbit device.

9 Claims, 7 Drawing Sheets

(56) References Cited

U.S. PATENT DOCUMENTS

| | | | |
|---|---|---|---|
| 2014/0064905 A1* | 3/2014 | Prahlad | H02N 13/00 414/751.1 |
| 2014/0284884 A1* | 9/2014 | Daniels | B64G 1/646 277/590 |
| 2014/0306066 A1* | 10/2014 | Burch | B64G 1/646 244/172.4 |
| 2017/0015444 A1 | 1/2017 | Okada | |
| 2017/0081051 A1 | 3/2017 | Okada | |
| 2018/0029728 A1* | 2/2018 | Rasse | B64G 1/222 |
| 2018/0229865 A1* | 8/2018 | Maeda | B64G 1/66 |

FOREIGN PATENT DOCUMENTS

| | | | |
|---|---|---|---|
| JP | H06-340299 A | 12/1994 | |
| JP | 2974010 B1 * | 11/1999 | B64G 1/646 |
| JP | 2011162183 A | 8/2011 | |
| JP | 2013-237443 A | 11/2013 | |
| JP | 2015-174647 A | 10/2015 | |
| JP | 2015-199379 A | 11/2015 | |

\* cited by examiner

CAPTURING PLATE, ON-ORBIT DEVICE AND METHOD FOR CAPTURING

BACKGROUND

Field

The present invention relates to capturing plates, on-orbit devices and methods for capturing.

Description of Related Art

In outer space, the "docking" technique is highly needed. This technique is to unite two objects in space and fix them. The docking technique is currently used to dock transfer vehicles with the International Space Station, and is necessary to provide services in orbit or to capture an out-of-service satellite in space.

The docking mechanism, however, is very difficult because highly accurate control is required, and therefore an even small displacement results in separation of a target caused by the reaction. The docking typically requires a driving system, including motors and gears, and the failure rate of such a driving system is high. Also, heavy structures are required for both capturing device and target object. For example, a conventionally examined docking technique is proposed in Patent Document 1.

A target capturing technique that does not need a complicated docking technique has been proposed, which captures a target with a capturing device including an bonding component made up of adhesive (Patent Document 2).

CITATION LIST

Patent Documents

[Patent Document 1] Japanese Patent Application Laid-Open No. 2013-237443
[Patent Document 2] Japanese Patent Application Laid-Open No. 2015-174647

SUMMARY

Technical Problem

Such a technique of bonding two objects with an bonding component made up of adhesive in space does not need a complicated mechanism. Therefore this technique looks promising to provide aforementioned services in orbit or to capture an out-of-service satellite in space. The surface of a target satellite, however, may not be flat with antennas or sensors, or may have a film for thermal control called MLI (Multi Layer Insulation). As such, the bonding with an bonding component does not ensure 100% successful capturing.

In view of these circumstances, the present invention aims to provide a means and a method capable of improving the performance of capturing of an on-orbit device in space by a capturing device including an bonding component made up of adhesive, regardless of the structure or the material of the outer surface of the on-orbit device.

Solution to Problem

The present inventor found that it is effective to provide an on-orbit device with a capturing plate to improve the performance of capturing of the on-orbit device in space by a capturing device including an bonding component made up of adhesive.

That is, one aspect of the present invention relates to a capturing plate that is to be attached to an on-orbit device. The capturing plate is attached to a part of the on-orbit device where a capturing device bonds to the on-orbit device in space with an bonding component of the capturing device, with the bonding component including adhesive. In this way, the capturing plate is attached to an on-orbit device, whereby the bonding component of the capturing device can be bonded to the capturing plate of the on-orbit device easily and reliably regardless of the structure or the material of the outer surface of the on-orbit device.

For instance, the capturing plate is comprised of a single material. By selecting a material having high degree of adhesiveness with the bonding component, the ease of capturing of an on-orbit device can be improved even when the capturing plate is made of such a single material.

Preferably the capturing plate includes a base and a surface-treated layer placed on the base. With this configuration, the capturing plate can have various effective functions for capturing, as compared with the capturing plate made of a single material only.

For instance, the surface-treated layer is configured to enhance the adhesiveness of the base with the bonding component. With this configuration, the base can have enhanced adhesiveness with the bonding component, as compared with the base made of a single material.

For instance, the surface-treated layer is configured to give a mark or a color to the base. Such a mark on the capturing plate enables the detection of a rotating speed of the on-orbit device. When an on-orbit device is to be disposed of, i.e., becomes debris, the on-orbit device starts to rotate. Detection of the rotating speed is useful to capture an on-orbit device which became debris. A color given to the capturing plate enables thermal control of the on-orbit device.

For instance, the surface-treated layer is configured to reflect light. This allows identification of the location of the capturing plate and accordingly the location of the on-orbit device by detecting the sunlight reflection from the surface-treated layer.

The capturing plate may be divided into a plurality of pieces. With this configuration, when a structure, such as a sensor, is present on the surface of the on-orbit device, such pieces of the capturing plate can be disposed so as to avoid such a structure.

Preferably, the capturing plate is attached on the principal axis of maximum inertia of the on-orbit device. In space, an on-orbit device rotates in a complicated manner around its three principal axes of inertia, and eventually rotates around the principal axis of maximum inertia. Therefore, when the plate is attached on the principal axis of maximum inertia, an on-orbit device can be easily captured.

The capturing plate may include a guide structure to define the bonding position of the on-orbit device with the capturing device. This can improve the accuracy in bonding position of the on-orbit device with the capturing device.

Another aspect of the present invention relates to an on-orbit device, to which the above-described capturing plate is attached. Such an on-orbit device, to which the capturing plate is attached, enables capturing of the on-orbit device for various operations by a capturing device.

Another aspect of the present invention relates to a method for capturing an on-orbit device. The method includes: moving a capturing device including an bonding component made up of adhesive to the on-orbit device, to which the capturing plate is attached, in space; and letting the bonding component of the capturing device bond to the capturing plate of the on-orbit device. This allows the on-orbit device to easily dock with the capturing device for capturing.

Advantageous Effects of Invention

According to the present invention, an on-orbit device can be more readily captured in space by a capturing device including an bonding component made up of adhesive regardless of the structure or the material of the outer surface of the on-orbit device.

DETAILED DESCRIPTION

The following describes embodiments of the present invention, with reference to the attached drawings. As described above, according to the finding by the present inventor, it is effective to provide an on-orbit device with a capturing plate to improve the performance of capturing of the on-orbit device in space by a capturing device including an bonding component made up of adhesive.

Figure 1:
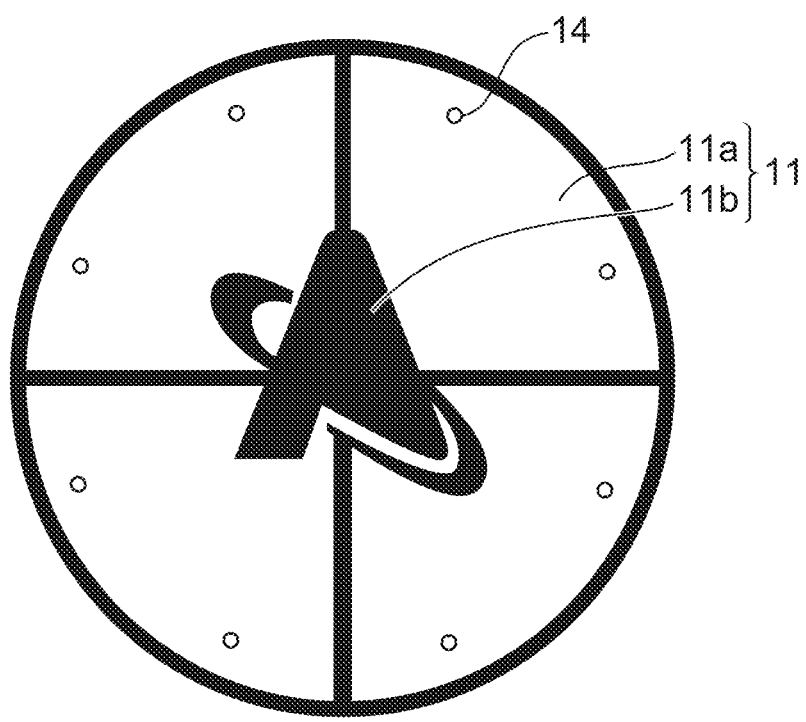
FIG. 1 is a plan view showing one example of the configuration of a capturing plate according to the present embodiment.
Figure 2:
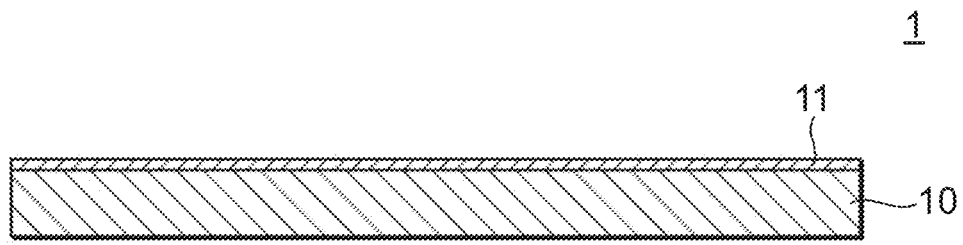
FIG. 2 is a cross-sectional view of one example of a capturing plate according to the present embodiment.

FIG. 1 is a plan view of a capturing plate in one example according to the present embodiment. FIG. 2 is a cross-sectional view of a capturing plate in one example according to the present embodiment.

A capturing plate 1 is attached to an on-orbit device. The capturing plate 1 is attached to the on-orbit device at a part to be bonded with an bonding component of a capturing device in space, where the bonding component is made up of adhesive. The on-orbit device is not limited as long as it is a device used in space, which may be a satellite or a rocket.

The capturing plate 1 has a thickness of a few hundred μm to a few mm; for example, the thickness may be about 1 mm. In the example of FIG. 1, the capturing plate 1 has a disk shape. The capturing plate may instead have a rectangular shape. The capturing plate 1 has a diameter of a few tens of cm; for example, the diameter may be about 200 mm.

The capturing plate 1 includes a base 10. Preferably the base 10 is made of a material that is lightweight and has good stiffness, adhesiveness with the bonding component and space tolerance. Since the capturing plate 1 is attached to an on-orbit device, such as a satellite, it has to be lightweight. The preferable weight is about 50 g to 100 g. Space tolerance includes tolerance to a temperature change in space, tolerance to vacuum in space, and minimal influence on thermal control of the satellite to which it is attached. Examples of such a material include metals and metal-ceramic composite materials. Specific examples include aluminum, stainless steel, magnesium, titanium, copper, and aluminum/silicon composite materials. The capturing plate 1 may include only the base 10 made of a single material. By selecting a material having high degree of adhesiveness with the bonding component, the ease of capturing of an on-orbit device can be improved even when the capturing plate is made of such a single material.

In the present embodiment, the capturing plate 1 includes the base 10 and a surface-treated layer 11 placed on the base 10. With this configuration, the capturing plate can have additional various effective functions for capturing, as compared with the capturing plate made of a single material only.

In the example of FIG. 1, the surface-treated layer 11 includes two surface-treated layers 11a and 11b.

The surface-treated layer 11a is configured to enhance the adhesiveness of the base with the bonding component. With this configuration, the base can have enhanced adhesiveness with the bonding component, as compared with the base made of a single material. For instance, in the case of a base made of aluminum, oxide coating from phosphoric acid anodizing (PAA) may be used as the material of the surface-treated layer 11a to enhance the adhesiveness of the base. Oxide coating from phosphoric acid anodizing (PAA) refers to a metal-oxide coating formed at the surface of the base 10 by anodic oxidation of the base 10 with phosphoric acid as electrolyte solution. When the base is made of other materials, appropriate treatment to enhance the adhesiveness of this material may be used.

Figure 3:
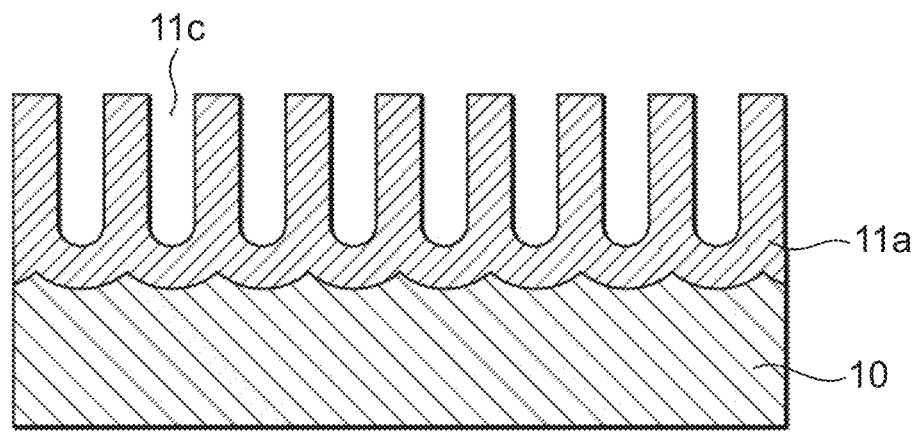
FIG. 3 is an enlarged cross-sectional view of a surface-treated layer made of oxide coating from phosphoric acid anodizing (PAA).

FIG. 3 is an enlarged cross-sectional view of the surface-treated layer 11a made of oxide coating from phosphoric acid anodizing (PAA). Oxide coating from phosphoric acid anodizing (PAA) has countless holes 11c having a relatively large diameter, and the diameter of the holes is 100 to 150 nm, for example. This facilitates the adhesive of the bonding component of the capturing device to permeate into the holes 11c, and so adhesiveness between the bonding component and the capturing plate 1 can be improved.

The surface-treated layer 11b is configured to display a mark or a color on the base. FIG. 1 shows a cross-like mark with a logo at the center. The actual embodiment may have no logo, and the mark may not be a cross. Such a mark on the capturing plate 1 enables the detection of the rotational speed of the on-orbit device. When an on-orbit device is disposed and becomes debris, it starts to rotate. Detection of the rotational speed is useful to capture an on-orbit device that has become debris. A color given to the capturing plate enables thermal control suitable for the type of the on-orbit device (e.g., an artificial satellite or a rocket). For instance, in the case of a base made of aluminum, sulfuric acid anodizing treatment may be performed to the surface-treated layer 11b so as to display a mark or a color on the base. In other examples, chromic acid anodizing (CAA), boric sulfuric acid anodizing (BSAA), and tartaric acid anodizing can be used to enhance corrosion resistance and not to degrade fatigue tolerance of the metal.

Unlike the surface-treated layers 11a and 11b, the surface-treated layer 11 may be configured to reflect light. Thus, the location of the capturing plate may be identified and, accordingly, the location of the on-orbit device by detecting the sunlight reflected from the surface-treated layer. Preferably, mirror-surface treatment can be applied to the surface treated layer to reflect light.

The capturing plate 1 may include the surface-treated layers 11*a* and 11*b* on a single base. Alternatively, the capturing plate 1 may be formed by preparing a portion of the base with the surface-treated layer 11*a* formed thereon and another portion of the base with the surface-treated layer 11*b* formed thereon, and then joining these portions. FIG. 1 exemplifies the combination of the surface-treated layers 11*a* and 11*b* as the surface-treated layer 11. The surface-treated layer shall include at least one of the surface-treated layers as stated above, and may be a combination of other surface-treated layers.

The capturing plate 1 may include a guide structure to define the bonding position of the on-orbit device with the capturing device. This can improve the accuracy in bonding position of the on-orbit device with the capturing device.

Figure 4:
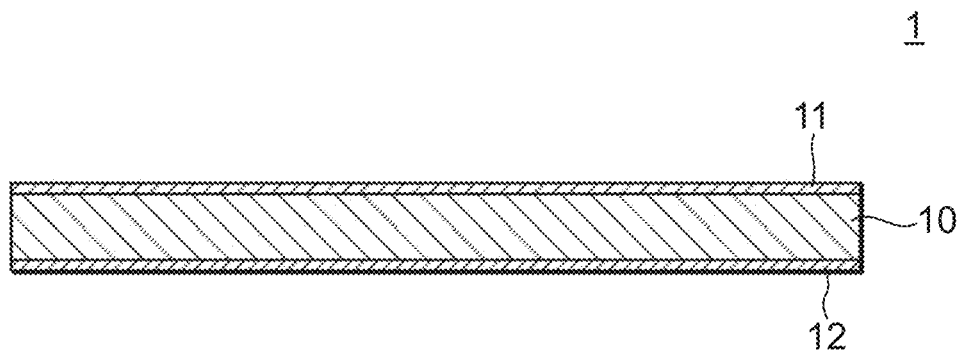
FIG. 4 shows one example of a guide structure placed on the capturing plate.

FIG. 4 shows one example of the guide structure. As shown in FIG. 4, a magnetic layer 12 is placed as the guide structure on back side of the base 10, which is the opposite side of the surface-treated layer 11. The magnetic layer 12 is made of magnetic powder. Examples of the material of the magnetic layer 12 include iron and cobalt. In this case, a magnet may be disposed on a portion of the bonding component of the capturing device, whereby the bonding position of the on-orbit device with the capturing device can be defined. This can improve the bonding strength of the bonding component and the capturing plate 1.

The guide structure is not limited to the above, and other configurations may be used. For instance, a protrusion may be placed on the surface of the capturing plate 1 to guide the bonding component of the capturing device at a correct position for bonding.

Referring back to FIG. 1, the capturing plate 1 has attachment holes 14 at the outer edge. The attachment holes 14 may be screw holes, for example. This allows the capturing plate 1 to be attached to an on-orbit device with screws.

In the example of FIG. 1, the capturing plate 1 is either one piece or a plurality of pieces that are joined into one piece. The capturing plate 1 may also be divided into a plurality of pieces. In this case, when a structure, such as a sensor, is present on the surface of the on-orbit device, such pieces of the capturing plate can be placed so as to avoid such a sensor.

Figure 5:
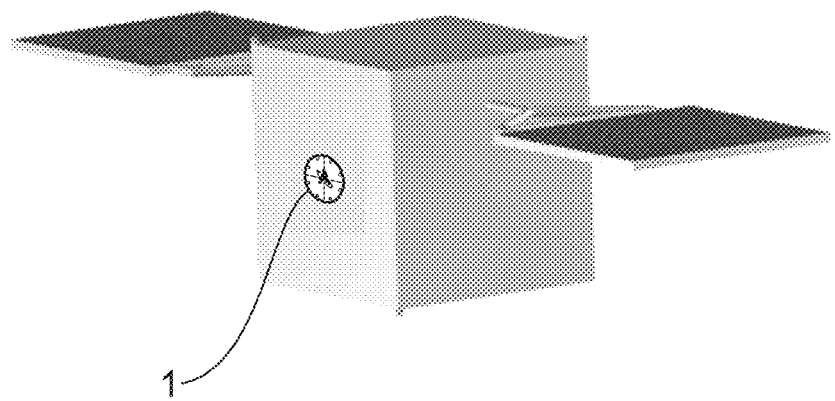
FIG. 5 shows the schematic configuration of an on-orbit device according to the present embodiment.

FIG. 5 shows the schematic configuration of an on-orbit device 2 including the capturing plate 1 according to the present embodiment.

As shown in FIG. 5, the capturing plate 1 is attached to a portion of the outer surface of the on-orbit device 2. The capturing plate 1 is attached to the on-orbit device before launching of the on-orbit device 2 into space. This facilitates capturing of the on-orbit device 2 by a capturing device described later, for disposal or orbit correction of on-orbit device 2.

Preferably the capturing plate 1 is attached on the principal axis of maximum inertia of the on-orbit device 2. In space, an on-orbit device rotates in a complicated manner around its three principal axes of inertia, and eventually rotates around the principal axis of maximum inertia. Therefore, when the plate is attached on the principal axis of maximum inertia, an on-orbit device can be easily captured. More preferably, the capturing plate 1 is attached so that the principal axis of maximum inertia of the on-orbit device 2 penetrates the center of the capturing plate 1.

The on-orbit device 2 according to the present embodiment enables the on-orbit device 2 to be captured by a capturing device for various operations. This enables various operations to the on-orbit device in space, including disposal, orbit correction and orbit keeping as described later.

Figure 6:
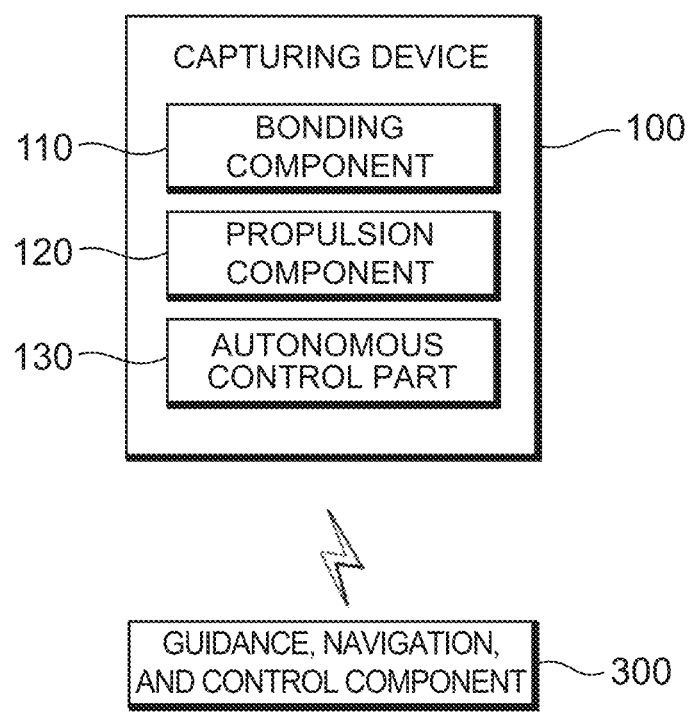
FIG. 6 shows the configuration of a system to capture an on-orbit device including a capturing plate of the present embodiment.
Figure 7:
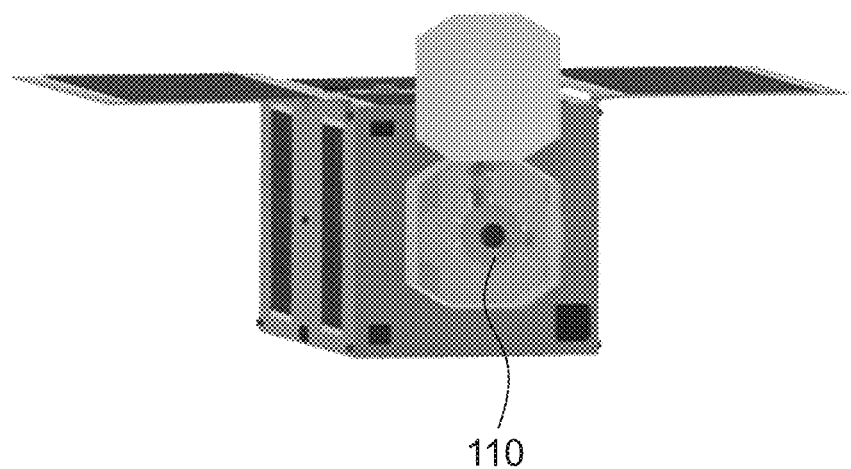
FIG. 7 shows the schematic configuration of a capturing device according to the present embodiment.

FIG. 6 shows the configuration of a capture system to capture an on-orbit device 2 including a capturing plate 1 of the present embodiment. FIG. 7 shows the schematic configuration of a capturing device.

The capture system includes a capturing device 100 to be launched into space and a guidance and control component 300 which guides the capturing device 100 to a target to be captured, on-orbit device 2.

The capturing device 100 is attached to a space vehicle, such as a rocket, and is configured to be launched into space with the space vehicle. The capturing device 100 includes an bonding component 110 to bond to a target existing in space, and a propulsion component 120 to get thrust. The capturing device bonds to the target with the bonding component 110 and moves with the propulsion component 120 so as to move the target to a predetermined position. When moving a target, the capturing device 100 preferably moves the target by pushing it. The capturing device may also move the target by pulling it. Preferably the adhesive used on the bonding component 110 can absorb the impact from a target while retaining adhesiveness, can tolerate a temperature difference between the space environment and the target, and does not transmit heat to the body of the capturing device 100. Silicone adhesive is preferably used as such adhesive. The adhesive is not limited to silicone adhesive, and other types of adhesive may be used. In addition to such adhesive, a mechanical holding structure to hold the target may be provided to assist the capturing device 100 to capture the target. For the propulsion component 120, a solid-fueled thruster, a small-sized ion thruster, a digital thruster or the like can be used.

In addition, the capturing device 100 has an autonomous control part 130 to control its own position and attitude. For the autonomous control part 130, a thruster controller or the like may be used to control a maneuvering thruster to correct the deviation in posture angle or in position detected by a gyro sensor or a GPS.

The Guidance, Navigation, and Control component 300 is allocated at a ground station, and is to move the capturing device 100 close to a target through predetermined communication means.

Figure 8:
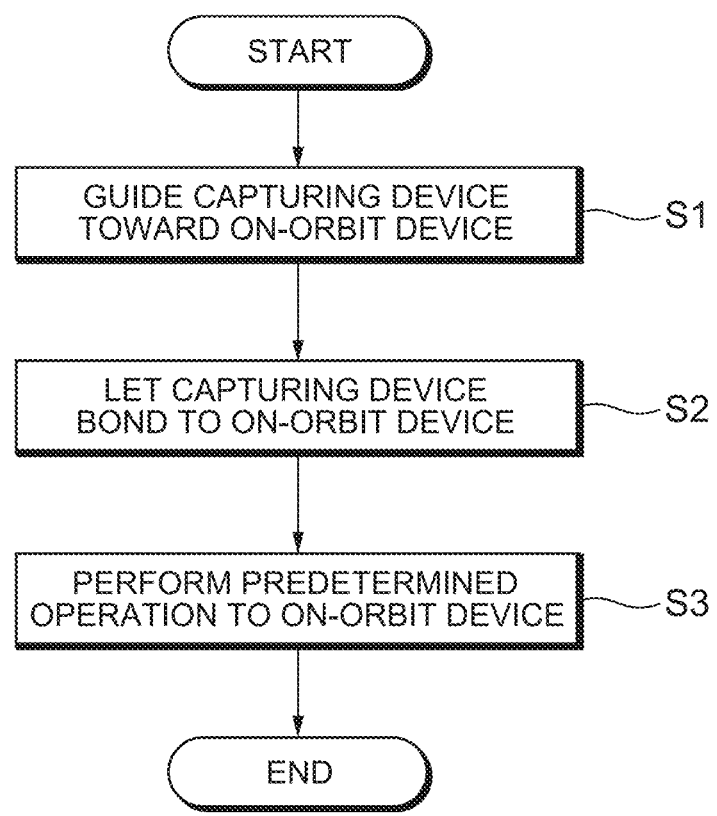
FIG. 8 is a flowchart of a method for capturing according to the present embodiment.

The following describes a method for capturing according to the present embodiment, with reference to the flowchart of FIG. 8.

Firstly, the capturing device 100 is attached to a space vehicle, and is launched close to a target on-orbit device (guide step: S1). In the guide step S1, the capturing device 100 may be moved relatively close (e.g., few kilometers) to a target space debris by GPS navigation, for example, the capturing device 100 may be brought close to the space debris at a position of tens to hundreds meters from the space debris using a star tracker or the like, and then the capturing device 100 may be brought close to the position of a few meters by an optical camera or the like.

Figure 9:
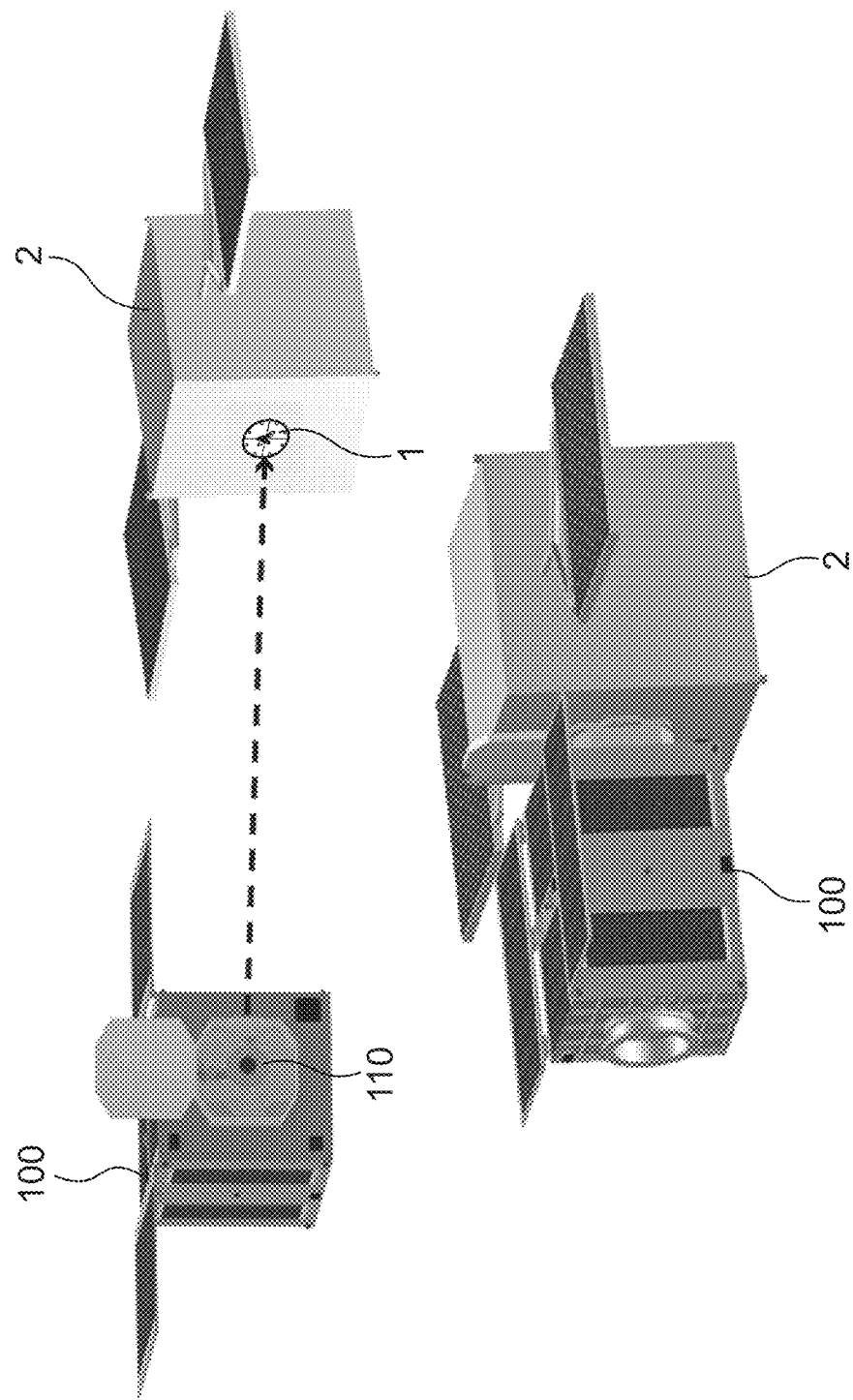
FIG. 9 explains a method for capturing according to the present embodiment.

Next, as shown in FIG. 9, the capturing device 100 is allowed to bond to the capturing plate 1 of the on-orbit device 2 with the bonding component 110 while controlling the attitude and the position of the capturing device 100 with the autonomous control part 130 (bonding step: S2). This allows the on-orbit device 2 to dock with the capturing device 100 (FIG. 9).

Subsequently, a predetermined operation is executed to the on-orbit device 2 (operation step: S3). This operation depends on the purpose of capturing on-orbit device 2.

When the on-orbit device 2 is space debris and the purpose of capturing is disposal of the space debris, the capturing device 100 is moved toward the atmosphere so as to convey the on-orbit device into the atmosphere. This enables the space debris to enter the atmosphere and to be burned. The capturing device 100 also is burned with the space debris and is discarded.

When the on-orbit device 2 is a satellite and the purpose of capturing is to correct the satellite orbit, the capturing device 100 is moved toward a second orbit different from a current first orbit so as to convey the satellite toward the second orbit. This enables the satellite to move from the first orbit to the second orbit. The capturing device 100 can coexist with the satellite in the state of bonding to the satellite.

When the on-orbit device 2 is a satellite and the purpose of capturing is to keep the orbit of the satellite, the propulsion component 120 of the capturing device 100 is controlled to keep the position of the satellite bonded to the capturing device 100 in a geostationary orbit. This enables the satellite to keep the position in the geostationary orbit (orbit-keeping). In this case also, the capturing device 100 can coexist with the satellite in the state of bonding to the satellite.

In these ways, a predetermined operation is executed for the on-orbit device 2. The operation following the capturing is not limited, and other types of operations may be performed. The capturing device may be configured to separate it from the target after the predetermined operation (conveyance or orbit-keeping) ends.

In the case of debris removal, a step of acquiring a debris-state may be performed between the guide step S1 and the bonding step S2. In this step, a shape of the space debris and/or a rotation state of the space debris are acquired. After such a step, the capturing device 100 finally approaches the target. This enables more reliable bonding.

As described above, according to the method for capturing of the present embodiment, an on-orbit device 2 can be captured easily and reliably in space by a capturing device 100 which embeds an bonding component 110 made up of adhesive.

More than one capturing devices 100 may be provided for multi-rendezvous (multi-docking) with more than one of targets, and every time a target is captured, the corresponding capturing device 100 may be deployed.

The above-described method for capturing using the capturing plate 1 may be combined with other methods for capturing. For instance, after a capturing device 100 is installed into an on-orbit device 2 using the bonding component 110 and the capturing plate 1, another mechanical docking system may be used for them. This can provide an on-orbit service, such as refuel, data transfer, and repairing.

The present invention is not limited to the embodiments as stated above, and design modifications to these embodiments, which will be made by a person skilled in the art as appropriate, are also included in the scope of the present invention as long as they have the features of the present invention. That is, each element in the above embodiments and the arrangement, materials, conditions, shapes, dimensions, etc., thereof are not limited to those described above and may be modified as appropriate. Each element in these embodiments can be combined as long as such combination is technically possible, and such a combination also is included in the scope of the present invention as long as they have the features of the present invention.

REFERENCE SIGNS LIST

1 Capturing plate
2 On-orbit device
10 Base
11, 11a, 11b Surface-treated layer
11c Hole
12 Magnetic layer
14 Attachment hole
100 Capturing device
110 Bonding component
120 Propulsion component
130 Autonomous control part
300 Guidance, Navigation, and Control component

What is claimed is:

1. A capturing plate, the capturing plate comprising:
a base;
a surface treated layer disposed on a front side of the base; and
a magnetic layer disposed on a back side of the base,
wherein the capturing plate is included on an on-orbit device, the on-orbit device being configured to be captured by a capturing device, and
wherein the magnetic layer is configured to serve as a guide structure that defines a bonding position of the on-orbit device with the capturing device by a magnetic force and the surface treated layer is configured to permanently bond the on-orbit device to a bonding component including adhesive in the capturing device by an adhesive force of the adhesive, and
wherein the surface treated layer is a metal-oxide coating layer formed by anodic oxidation of aluminum of the base and includes a plurality of holes each having a diameter in a range from 100 nm to 150 nm to facilitate permeation of the adhesive into the plurality of holes.

2. The capturing plate according to claim 1, wherein the surface-treated layer includes a mark or a color.

3. The capturing plate according to claim 1, wherein the surface-treated layer is configured to reflect light.

4. The capturing plate according to claim 1, wherein the capturing plate includes a plurality of divided pieces.

5. The capturing plate according to claim 1, wherein the capturing plate is attached on a maximum principal axis of inertia of the on-orbit device.

6. The capturing plate according to claim 1, wherein the adhesive is silicon adhesive.

7. The capturing plate according to claim 1, further comprising a protrusion that is disposed on a surface of the capturing plate and configured to guide the capturing device.

8. A capture system, the capture system comprising:
a capturing plate included on an on-orbit device; and
a capture device configured to capture the on-orbit device and including a bonding component, the bonding component including adhesive,
wherein the capturing plate includes:
a base;
a surface treated layer disposed on a front side of the base; and
a magnetic layer disposed on a back side of the base,
wherein the magnetic layer is configured to serve as a guide structure that defines a bonding position of the on-orbit device with the capturing device by a magnetic force and the surface treated layer is configured to permanently bond the on-orbit device to the bonding component of the capturing device by an adhesive force of the adhesive.

9. The capture system according to claim 8, wherein the surface treated layer is a metal-oxide coating layer formed by anodic oxidation of a material of the base.

* * * * *